United States Patent
Abhyankar et al.

(10) Patent No.: US 7,212,322 B2
(45) Date of Patent: *May 1, 2007

(54) PREVIEW FUNCTION IN A DIGITAL DATA PRESERVATION SYSTEM

(75) Inventors: Vishwas G. Abhyankar, Pittsford, NY (US); Victor C. Wong, Rochester, NY (US); Robert Breslawski, Brockport, NY (US); Robert S. Jones, Rochester, NY (US); Badhri Narayan, Rochester, NY (US); Robert V. Reisch, Fairport, NY (US); Donald R. Williams, Williamson, NY (US); Robert B. Bayley, Hilton, NY (US); Lou Horvath, Rochester, NY (US); Nelson G. Blish, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 973 days.

This patent is subject to a terminal disclaimer.

(21) Appl. No.: 10/099,767

(22) Filed: Mar. 15, 2002

(65) Prior Publication Data

US 2003/0174349 A1    Sep. 18, 2003

(51) Int. Cl.
*G03F 3/08* (2006.01)

(52) U.S. Cl. ............. 358/527; 358/403; 358/404; 358/1.8; 717/175; 707/204; 715/530; 382/162; 382/237

(58) Field of Classification Search ............. 358/403, 358/404, 1.9; 717/175; 707/204; 715/530; 382/237, 162
See application file for complete search history.

(56) References Cited

U.S. PATENT DOCUMENTS

| | | | |
|---|---|---|---|
| 5,933,257 A * | 8/1999 | Kurita | 358/527 |
| 5,971,281 A * | 10/1999 | Frary et al. | 235/487 |
| 6,043,845 A * | 3/2000 | Thompson | 375/240.01 |
| 6,442,296 B1 * | 8/2002 | Smith et al. | 382/237 |
| 6,691,309 B1 * | 2/2004 | Lorie | 717/175 |
| 2001/0053247 A1 * | 12/2001 | Sowinski et al. | 382/162 |
| 2003/0142325 A1 * | 7/2003 | Leslie | 358/1.1 |

FOREIGN PATENT DOCUMENTS

WO    00/28726    5/2000

* cited by examiner

*Primary Examiner*—Douglas Q. Tran
*Assistant Examiner*—Michael Burleson
(74) *Attorney, Agent, or Firm*—Nelson Adrian Blish

(57) ABSTRACT

A digital preservation system (10) for accepting a digital data record as input, for providing a preview of the digital data record on a display screen (80), for writing the data record in human-readable form onto a preservation-quality medium (210), for storage of the medium (210), and for retrieval of the data record from the medium (210). The digital preservation system (10) preserves a data record in human-readable form, along with an associated metadata record, allowing the human-readable preserved data record to be readable in the distant future, independent of specific reading hardware. The preview function allows an operator to specify storage and retrieval characteristics for the data record.

46 Claims, 7 Drawing Sheets

PREVIEW FUNCTION IN A DIGITAL DATA PRESERVATION SYSTEM

CROSS REFERENCE TO RELATED APPLICATIONS

Reference is made to commonly-assigned copending U.S. patent application Ser. No. 10/000,407, filed Nov. 2, 2001, entitled DIGITAL DATA PRESERVATION SYSTEM, by Victor C. Wong, et al., the disclosure of which is incorporated herein.

FIELD OF THE INVENTION

This invention generally relates to long-term preservation of digital data and in particular relates to a preview function provided in a system for long-term preservation of digital data on human-readable media.

BACKGROUND OF THE INVENTION

In order to clarify the scope of the present invention, it is first useful to distinguish between the terms "data archiving" and "data preservation" as used in this application. Conventional approaches to digital data archiving, also termed digital data storage, use a variety of storage media such as magnetic tape or disk and optical tape or disk media, and may employ techniques such as periodic tape backup, redundant disk storage, and the like. Use of these storage media and techniques provides some level of assurance that a digital data file can be reliably retrieved for at least a few years after it is initially created and stored. In contrast to digital data archiving, digital data preservation is a relatively new concept. Only recently has it become apparent that there is considerable need for workable solutions that allow long-term retention of digital data for periods exceeding those provided by established data archiving methods. Conventional data storage and archiving systems provide limited term solutions that allow reliable retrieval of backed-up digital data for a period of approximately 5–10 years. Data preservation systems, on the other hand, must provide solutions that not only allow retrieval of digital data for much longer periods, but also are capable of allowing usability of the data for periods extending decades or even hundreds of years into the future. This life-span is conditioned in large part by the projected life-span of preservation media, expected to last for hundreds of years when stored under suitable conditions.

In contrast with digital data archiving, digital data preservation offers a number of added advantages. For example, in order to be readable and usable years hence, archived digital data requires some type of migration, such as from one media type to another or from an earlier data format to a later data format. Without migration of some kind, archived data, over time, gradually becomes unreadable and therefore loses its value. In stages, the archived data first becomes unusable, as data formats and application software are revised or replaced. Then, as reading and processing hardware become obsolete, the archived data simply becomes unrecoverable. The task of maintaining archived data through migration can be daunting, requiring, over a period of years, that the archived data be translated from one data format to another or transferred from one storage medium to another. With repeated migration operations, there is increased likelihood of error and of loss of interpretable data. According to some industry estimates, as much as 5% of stored data can be lost during a typical migration operation. Thus, maintaining archived digital data for long periods of time may be costly and labor-intensive and can involve risk of data loss.

In contrast to such well-known difficulties with digital data archiving, digital data preservation would allow digital data to be retrievable in a readable state for many years. Ideally, digital data preservation would eliminate, or at least alleviate, any need for data migration and its concomitant costs and risks. Users of digital data preservation systems would thus enjoy the benefits of minimal risk for data loss or obsolescence, even in the event of severe infrastructure disruption.

Digitally created documents, created using some sort of logic processor and maintained in file form, are often shared among multiple users in digital form, some only rarely being written to paper. Typically, digitally created documents are stored and transferred as files in open data formats, such as TIFF, HTML, JPEG, XML, or .txt, for example. By design, some of these open data formats can be routinely interpreted by software running on a number of different computer platforms. Alternately, other common data formats are designed to be proprietary, interpretable only using specific application software. A goal of digital preservation is to retain the usability and original intention of the data without requiring migration of data format or of data storage mechanisms, allowing files to be certifiably unaltered in their interpreted form, able to be used for purposes such as legal evidence, for example.

In order to have preserved records considered as "certifiably unalterable", so that, for example, such records could even be considered as legal evidence, a preservation system would need to provide "Write-Once/Read-Many-Times/Erase-Once" function. Write-Once capability would disallow alteration of preserved data and unauthorized addition of records to preservation media. Read-Many-Times capability would allow retrieval of preserved data from the media with consistent accuracy. Erase-Once capability would assure complete expungement of specific data records as needed.

Current archiving methods for digital data, allowing access to data only in digital format, have a number of shortcomings. Among problems well known by those skilled in the data archiving arts are aging of equipment, limitations in the useful life of magnetic and optical storage media, and inevitable obsolescence of data formats, particularly where data formats are closely associated with specific hardware or with specific versions of operating systems or programming languages.

Long term preservation of digital data requires both that the original data be faithfully preserved and that this data can be interpreted in some form at any time in the future. This requirement means that the organization that stores the digital data can provide, at some future time, access not only to screen displays, printouts, and other system output, but also to the original data used to generate such output. To achieve this goal, methods for retrieving preserved digital data must be, insofar as is possible, independent of specific equipment. While there may have been various attempts at developing universally accepted data formats for different types of files, few standards have been developed or are likely to be adopted.

Human-readability has not been considered as a meaningful or useful characteristic for data preservation. However, the encoding of data in human-readable form may provide advantages that have been overlooked in any scheme for data encoding and archival. For example, there are baseline advantages for verifying authenticity of a document encoded in human-readable form, and thus for irrefutably validating the fidelity of the document to its original source. Future users of a document would then be assured that a preserved version would be a valid and true copy of an original document.

FIG. 1 illustrates the conventional approach to digital data archiving. Digital data is processed by a central processing unit (CPU) 200 running some type of operating system 204. An application 202, using utilities available from operating system 204, provides digital data output in some binary, machine-readable form. This digital data output is only usable to the originating application 202, or to another software application compatible with application 202. The digital data output has value only when interpreted and presented by application 202 in some form, such as that of a static display of text or images, interactive calculation, web page with dynamic links, or multimedia presentation for example. In the conventional model of FIG. 1, a binary storage hardware apparatus 206 stores the digital data output from application 202 onto binary storage media 208, such as magnetic tape, disk, or optical disk. With the arrangement of FIG. 1, the archived data is in an application-dependent form and therefore becomes unusable if the originating application 202 or operating system 204 become obsolete. Archived data also becomes unusable as binary storage media 208 degrades over time.

Technology development, by which early systems and software become obsolete, replaced by increasingly more capable tools, is also an important factor for consideration with respect to a digital data preservation system. Anticipated developments in data networking technology, in data interface methods, and in imaging technologies for storage and retrieval are likely to bring about corresponding changes in system hardware, with various components of a system becoming obsolete over time. Inherent to the design of a digital data preservation system solution must be a clear-cut strategy for allowing continuous upgrade, component by component, without jeopardizing the integrity of the preserved digital data.

Analog preservation media, such as microfilm, have been widely used for long-term retention of documents, drawings, and flat ASCII files, where data is encoded visually as black and white images. Among proven benefits of such media are long lifetimes, capability for very high resolution, and inherent human readability. These analog preservation media have traditionally been used in systems employing optical cameras for recording and storing analog data, typically images of documents. With the growing need for retention of computer data, these analog media have also been employed in digital document archiving systems, such as the Document Archive Writer, Model 4800, manufactured by Eastman Kodak Company, Rochester, N.Y. Other Computer-Output-Microfilm (COM) recording systems have used similar analog media for long-term retention of processed and displayed data, in printout form. It is significant to note that existing systems use these types of analog preservation media solely for storing black and white images of documents that may be output by a typical application 202 (FIG. 1). Storage of digital data from application 202 is performed using conventional, magnetic or optical binary storage media 208.

A digital data file for preservation by a digital preservation system can originate from any of a number of sources and could comprise any of a number of types of data. As just a few examples, digital data files could be generated from scanned documents or scanned images, where the original source for the data was prepared or handled manually. Digital data files may comprise encodings of bitonal images, grayscale images, or even color images, such as the halftone separations used in color printing. Digital data files could be computer-generated files, such as spreadsheets, CAD drawings, forms created on-line, Web pages, or computer-generated artwork. Interactive and sensory stimuli such as sound and animation can also be stored as digital data files. Digital data files might even contain computer software, in source code or binary code format. In summary, there can be a need for long-range preservation of any type of digital data file, whether the actual file content is meaningful to an observer, such as when the file contains a document of some kind, or to a computer, such as when the file consists only of encoded computer program instructions.

Preservation of a digital data file typically requires that the data file be packaged in some standard fashion, so that at least some amount of metadata, that is, data about the file itself, can be stored with the data. For example, metadata associated with a CAD file might identify the originating software and revision, date of creation and revision of the data, designer name, departmental and project-related identifiers, delivery or completion date, workflow listing, access permissions levels, and the like. Metadata content can include not only basic information such as file ID and look-up information, but also information that optimizes subsequent data retrieval and interpretation, such as image quality metrics, and media/writer characteristics.

The likely obsolescence of specific data formats over time confounds the problem of data preservation. Depending upon the type of data source and upon factors such as the specific nature of a data file, many data formats can be expected to fade from use, thereby jeopardizing possible recall of data content at some future time. A number of organizations have already encountered this problem, acknowledging that sizable amounts of stored data have become very costly or even impossible to retrieve reliably.

Meanwhile, there have been some promising solutions proposed for providing data in a form that will continue to be readable in the future. One method intended to achieve this goal is the extensible markup language (XML) initiative. XML, document type description (DTD), and XML Schema constructs provide a degree of self-definition, inherently open structure, and computer platform portability and provide tools for data formatting by which definitions of data components can themselves be stored as metadata associated with a data file. However, there has been no attempt thus far to provide solutions using extensible markup languages and techniques that support long-term preservation and retrieval of data.

There have been methods disclosed for storing documents in a machine-readable format that is perceptible to a human observer. PCT application WO/28726 (Smith, Leonhardt, Frary) discloses storage of a two-dimensional document on a laser-writeable optical storage medium, wherein an image of the document is written onto the media along with the binary data representing the digital record. However, the solution disclosed in application WO 00/28726 is limited to storage of document data, which is merely a subset of the complete set of data types that may need to be preserved. A significant drawback of the PCT application WO 00/28726 system is that it employs conventional, optical storage medium, optical disk or tape written using a laser, thus limiting the lifetime of stored data. Furthermore, the Write-Many-Times characteristic of the system disclosed in PCT application WO 00/28726 makes the system unsuitable for preserving data records that are certifiably unaltered over time. Data written using the system disclosed in PCT application WO 00/28726 may be marginally "human-perceptible" in the sense that the visible effects of marking the optical medium under varying laser intensities could be perceived and interpreted by a human observer trained to interpret the resultant markings as binary 1s and 0s. However, this encoding method is inefficient in providing truly "human-readable" data that would be directly readable using a scanner or could even be read from the media by a human observer. Without intervening hardware, with its incumbent system dependencies, the binary data stored on the optical medium as disclosed in PCT application WO 00/28726 would be extremely difficult to obtain.

Copending, commonly-assigned U.S. patent application Ser. No. 09/703,059, filed Oct. 31, 2000, entitled "A Method and Apparatus for Long Term Document Preservation" discloses long term preservation methods for document data stored in virtual folders, utilizing an analog medium such as film. As with other solutions, this system does not provide the full set of possible preservation functions for a digital file. Significantly, the method noted in application Ser. No. 09/703,059 is limited to preserving the image of the document only, with no attempt to preserve the digitally created document data itself nor the metadata associated with the document in human-readable form.

The above-mentioned solutions, focusing more narrowly on saving documents and images for a time, have provided only "single point" solutions that are not adequate for addressing the larger data preservation problem. Documents themselves make up only a small subset of digital data that must be preserved. Typical forms of digital data other than documents that may require preservation include grayscale and color pictures and diagnostic images; spreadsheet data; satellite data and other instrumentation readings; audio, video and multimedia presentation data; software; HTML content; and database records, for example. It can be appreciated that preservation and retrieval of this broader base of digital data types requires alternate approaches beyond what may be needed for document preservation. For example, with digital data in this broader category, there may be a greater need for retention and retrieval of other underlying, related data, such as source data associated with or used to generate some part of an image or document.

Users of conventional systems for archival of documents and images on microfilm are familiar with the level of image quality obtained from such systems, based on long-term experience with optical recording methods. Even with the advent of digital archival writers, the basic model established with earlier optical recording methods has substantially been maintained. For example, with respect to overall image quality for the archived document or image, there are few options available with conventional monochrome image archival systems. Hence, there would be no need for viewing the results of an archival operation when a document is initially stored. However, the capability for storing color image data, encoded in a monochrome medium, provides a new model for document and image archival and preservation and makes some options available to users of archival and preservation systems.

It is well known that a document, when output on different printing apparatus using different print driver software, not only has obvious differences due to characteristics such as printer resolution and media response, but can also be formatted differently. To give an approximate idea of the final appearance of printed output, manufacturers of various software packages often provide a print preview function. Using print preview, a user can get a good idea of the final appearance of a document or image from a "soft copy" displayed on the computer screen. Gross differences in pagination, font use, and other characteristics of the final output are faithfully represented, allowing a user to verify that an output print will have the intended appearance. This type of preview function, however, has not been made available for archival or preservation systems. Nor has it been possible for a user of an archival system to view and select from possible options for image quality characteristics when a document or image is stored or retrieved. This has been due, in large part, to the processing time and cost required in order to show the results of an archival or preservation operation.

While independent archival services exist, the problem of digital archival has largely been a problem to be solved by the company, governmental unit, or other organization needing such a service. It is widely held that outsourcing archival services can be beneficial, lowering the actual cost of such service and improving the overall quality of the archival operation. When archival and preservation of data must be performed by a company, governmental unit, or other organization, the process of archival and preservation remains closely bound to the information content itself. From a business perspective, it can be beneficial to effectively separate ownership of the archival and preservation process from ownership of the information content, thereby allowing an independent vendor to provide archival services to any number of client organizations, while still reserving control and approval of the content to these client organizations.

A difficulty faced by vendors of digital archival and preservation services relates to operational cost in handling each document to be archived or preserved and in performing rigorous quality checks. It would be time-consuming and costly to provide customers with representative images of archived documents for their approval. It is well appreciated that tools for automating customer approval cycles and quality audits help to reduce cost and improve overall operating efficiency and long-term customer satisfaction for document preservation services.

A related difficulty is presented by the cost of sales. Typically, batch processing provides the most economical arrangement for document archival or preservation, with images on rolls of photosensitive media that require chemical processing following exposure. Given conventional workflow constraints, the task of processing and providing demonstration samples to prospective customers interrupts the cost-efficient workflow used for day-to-day operation. Thus, it can be appreciated that there is value in facilitating the process for demonstrating digital preservation system capabilities to prospective customers.

Thus, it can be seen that there is a demand for a digital data preservation system having a preview function that enables a user to view the results of a preservation operation for assessment and approval.

SUMMARY OF THE INVENTION

It is an object of the present invention to provide a preview function for a digital preservation system.

With this object in mind, the present invention provides a system for preservation of a data record, the system comprising:

(a) an input handler for accepting a preservation request to preserve said data record, for accepting input metadata associated with said data record to form a metadata record, and for conversion of said data record and said metadata record to generate a formatted data record;

(b) a data processor for accepting said formatted data record, for generating at least one preview image from said formatted data record, and for encoding, from said formatted data record, a print file;

(c) a preservation medium for recording said print file;

(d) a writer for marking said print file onto said preservation medium to form a human-readable preserved data record;

(e) a display for representing said at least one preview image;

(f) a storage apparatus for safekeeping of said human-readable preserved data record; and (g) a data recovery apparatus for obtaining, from said human-readable preserved data record, said data record and said input metadata record.

From another aspect, the present invention provides a method for preservation of a data record, the method comprising:

(a) encoding said data record in a format to form an encoded data record;

(b) encoding a metadata record corresponding to said encoded data record;

(c) processing said encoded data record to provide at least one preview image;

(d) displaying said at least one preview image and accepting a print instruction; and (e) in response to said print instruction, recording said encoded data record and said metadata record on a preservation medium, as a human-readable preserved data record.

A feature of the present invention is the display of one or more preview images that represent the preserved data record as it would appear under different retrieval conditions. A related feature of the present invention is the provision of an approval step when preserving a data record.

It is an advantage of the present invention that it represents, to a user, the image quality that is available for data record preservation and retrieval using different options. The method of the present invention makes it possible for a service vendor to offer long-term preservation services to a client organization and to simulate results of storage and retrieval under different conditions.

It is a further advantage of the present invention that it helps to facilitate the sales cycle for a vendor who offers digital preservation services. The present invention allows a digital preservation vendor to provide preview displays showing different levels of preservation and retrieval quality that are available.

It is a further advantage of the present invention that gives pricing flexibility to a vendor of digital preservation services, both at the time a document is preserved and at the time of retrieval.

It is a further advantage of the present invention that it allows the provider of digital preservation services to optimize usage of component equipment based on user selections.

It is a further advantage of the present invention that it allows a user of digital preservation services to economize at the time a digital record is initially preserved, minimizing the data storage requirements and consequent cost for storing the data record.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Definition of Encoded, Human-readable Data Record

It is instructive to define "human-readable data record" as this terminology is used in the present application. A human-readable data record is a unit of encoded digital data that is visibly recorded on a preservation medium. A human-readable data record may have multiple parts, each part encoded in a different manner. For example, a human-readable data record for a JPEG picture could include the following components:

JPEG data encoded in human-readable characters, for example, as ASCII characters;

A rasterized image reproduced on the preservation medium;

A bit-mapped data file represented in primitive form as binary (1/0) data and encoded on the preservation medium as a visible set of binary characters. Such binary character representation could be 1s and 0s, dots and spaces, or other visible markings that encode binary data. However, the preferred embodiment employs a Base-64 encoding, widely used for data file transfer on the Internet and familiar to those in the information arts, so that encoded data is represented as a series of ASCII characters.

Information about the JPEG file, termed metadata, encoded in human-readable characters, for example, as ASCII characters.

Thus, for example, preservation of a JPEG picture in multiple formats preserves the picture in a number of ways, so that picture data, and ultimately the picture itself, could be readily retrieved.

A human-readable data record need not contain image data in the conventional sense of a "visual image." Any type of digital data could be stored, visibly formed on a preservation medium, in a similar manner. Thus, for example, a spreadsheet, an audio file, a multimedia presentation, or even a compiled operating system could be encoded and preserved as a human-readable data record using the system and methods of the present invention.

Figure 1:
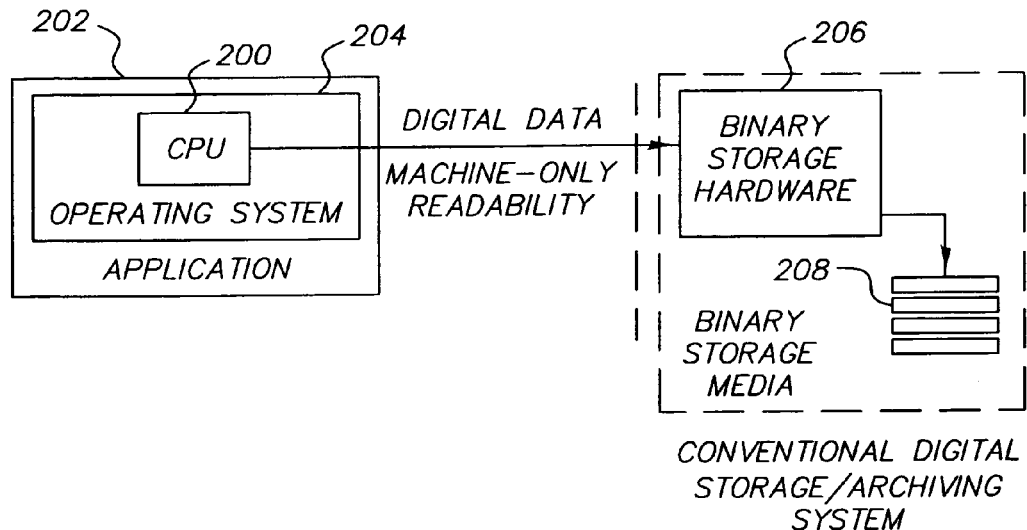
FIG. 1 is a block diagram showing the function of a conventional digital archiving system.
Figure 2:
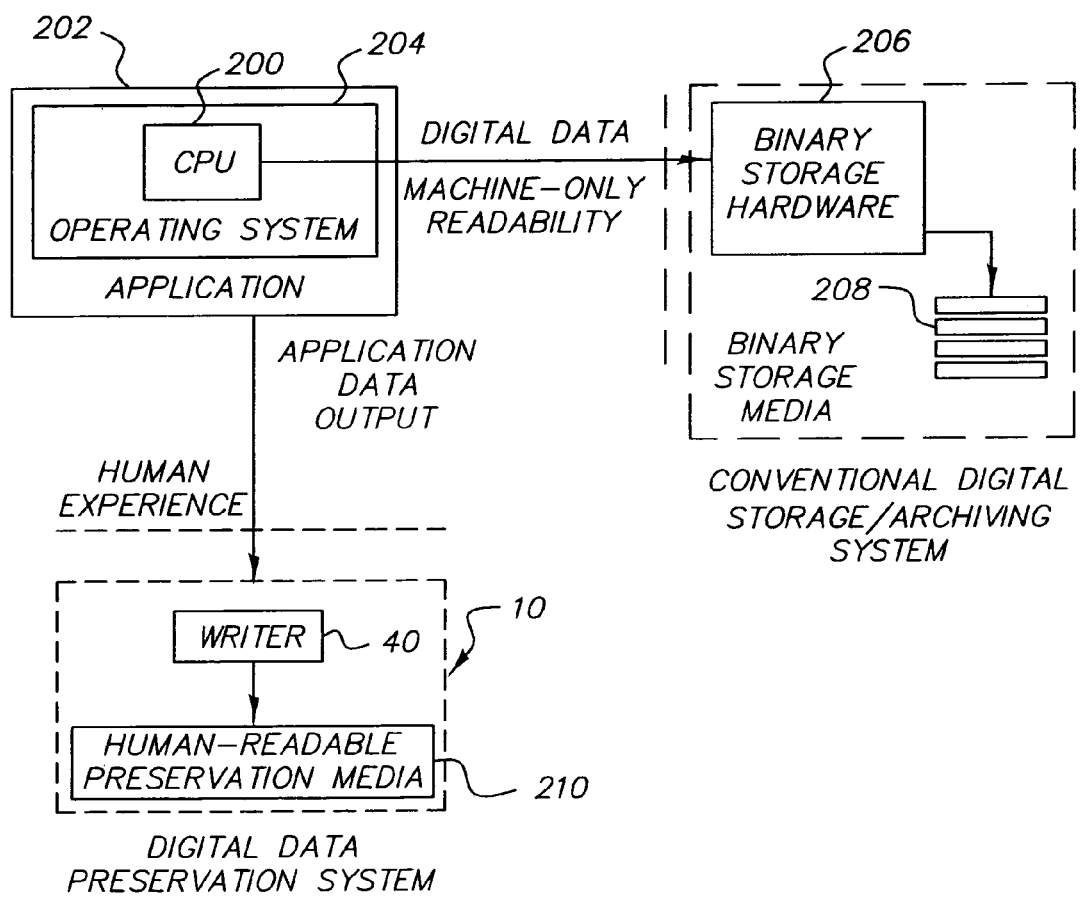
FIG. 2 is a block diagram contrasting the function of a digital data preservation system with the function of conventional digital archiving systems.

Referring to FIGS. 1 and 2, there is shown a comparison of digital data digital preservation system 10 with conventional digital archival systems. FIG. 1, described above, shows the function of the conventional archival system. In contrast, FIG. 2 shows both digital data digital preservation system 10 and a conventional digital archival system. With digital data digital preservation system 10, writer 40 images onto a human readable preservation medium 210. Digital data digital preservation system 10 stores a human-readable representation of digital data, independent of operating system 204, CPU 200, and application 202 dependencies. Emphasis is placed on preserving both the experiential representation of data output from application 202 and the data and metadata needed to support that representation. The data that is preserved could be visual, audio, tactile, or other sensory data, or could be some other type of output data for human apprehension.

It is instructive to emphasize the distinction between human-readable preservation media 210 and binary storage media 208 as is used by a conventional archiving system. Unlike a data record that is only machine-readable, a human-readable data record can ultimately be interpreted by a human viewer, possibly aided by magnifying optics. Human-readable preservation media 210 are encoded with markings that are visually discernable, typically under magnification. That is, the ability to read standard alphanumeric characters would be considered as the baseline requirement for retrieval of a human-readable data record by a person or by an instrument. Because of this "standalone" characteristic, the human-readable data record is independent of any specific hardware for reading the data record. The human-readable data record is ordinarily encoded in a specific data format; however, a human reader is able to read the encoded data, with the possible aid of magnification.

Examples of suitable human-readable preservation media 210 include microfilm and related film products and other types of medium having similar long-life expectancy and excellent image stability. In addition to film-based media, some other media types that may be acceptable, in some form, for use as human-readable preservation media include the following:

(a) electrophotographic media, when properly treated and finished;

(b) thermal media, such as thermal dye sublimation media;

(c) inkjet media, particularly using plastic film or reflective materials; and (d) metal plate materials, written using methods such as etching and laser ablation.

The materials that are used for human-readable preservation medium 210 are characterized by exceptionally long useful life. Binary storage media 208, on the other hand, include magnetic tapes or disks and optical storage media. Markings on binary storage media 208 are, in general, not readable to the human eye, whether aided or unaided by magnification, and are not suitable for reliable long-term data storage due to their relatively short lifespan and due to hardware and software dependencies for data access from these media. Any change to CPU 200, operating system 204, or application 202 can render data that has been recorded on binary storage media 208 to be unusable. By contrast, data recorded on human-readable preservation media 210 can still be interpreted, regardless of changes to CPU 200, operating system 204, or application 202.

As a preferred embodiment, the preview function of the present invention is best suited to a digital preservation system 10 having human-readable data associated with a preserved data record, as described above. However, for the purposes of this disclosure, the term "preservation" can be considered somewhat more broadly, to include long-term preservation as defined above as well as shorter-term archival of document images using conventional systems that employ digital imaging techniques.

Overview of System 10

Figure 3:
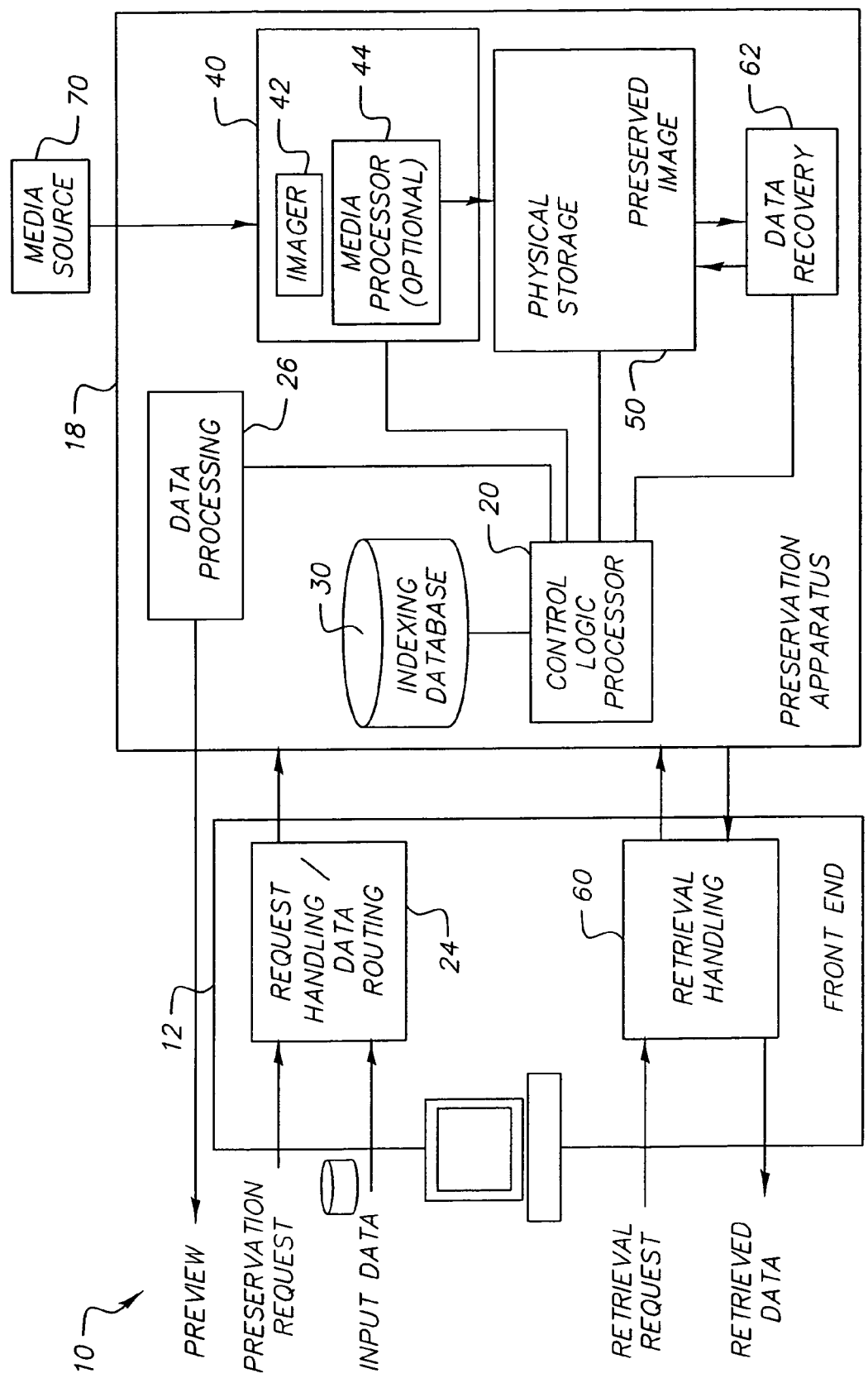
FIG. 3 is a block diagram showing the components of an apparatus of the present invention and their interrelationships.

Referring to FIG. 3, there is shown a digital preservation system 10 that is configured to accept preservation requests for preserving encoded data records and to accept retrieval requests for providing a copy of an encoded, preserved data record. Modular in design, digital preservation system 10 comprises a number of components, each of which has a preferred embodiment, but permits of a number of optional embodiments. It is instructive to emphasize that the modular design employed in the integration of components allows digital preservation system 10 to be suitably scaled to handle volume demands, makes it possible to offer multiple data preservation options in a single system 10, and provides a high degree of flexibility for growth and component-by-component upgrade.

Referring again to FIG. 3, a front end 12, typically implemented using a computer workstation terminal, provides an operator interface for accepting preservation and retrieval requests for encoded data that is managed by a preservation apparatus 18. A request handling/data routing preprocessor 24 acts as an input handler, processing operator requests and, for data preservation requests, accepting input data and information about the input data received by front end 12. For a data preservation request, request handling/data routing preprocessor 24 provides preprocessing for the input data. This preprocessing function may include optimization of the image for suitable reproduction by preservation apparatus 18. A key function of request handling/data routing preprocessor 24 is translating the input data into the standardized format accepted by preservation apparatus 18. Additional functions may include pre-processing required for some types of images. For example, preprocessing may adjust a fine line width within an image where preservation apparatus 18 may not be able to reproduce the original line width. Other specialized image preprocessing functions may enhance brightness, sharpness, or contrast, scale the image, preserve color information, attenuate image noise, or suitably adjust grayscale values to suit the requirements of preservation apparatus 18. Request handling/data routing preprocessor 24 may also perform specialized layout of images in preparation for writing output operation.

It must be noted that preprocessing functions provided by request handling/data routing preprocessor 24 are intended to be "benign" with respect to data record content. That is, preprocessing operations do not change the data contained in the data record. Rather, the preprocessing operations adapt the formatting of this data to suit characteristics of writer 40 and its associated preservation media in preservation apparatus 18.

After initial preprocessing functions have been completed, request handling/data routing preprocessor 24 then routes the input data and information about the input data to preservation apparatus 18. Preservation apparatus 18 provides a modular component for preservation of data that interacts with front end 12, but, except for an allowed set of interface commands and responses, operates as a "black box" with respect to front end 12. Preservation apparatus 18 contains a data processing element 26 that accepts the records for preservation that have been preprocessed by request handling/data routing preprocessor 24 in front end 12. When it receives a data record for preservation, data processing element 26 makes an entry in an indexing database 30. Data processing element 26 then processes and encodes the input data and its associated metadata to generate the encoded data record for preservation. The metadata may include, for example, information about the input data, the indexing entry, specifications of the encoding format, writer and media characteristics, and other image quality information useful for optimizing data retrieval. Data processing element 26 then transmits this encoded data record to a writer 40. In writer 40, an imager apparatus 42 records the human-readable data record onto a segment of raw media (not shown) from a media source 70. Depending on the type of raw media, a media processor 44 may be needed to develop the image for the final encoded data record onto the preservation medium. A physical storage apparatus 50 provides secure housing for maintaining the medium on which the final encoded data record is preserved. Physical storage apparatus 50 could be a climate-controlled storage facility, vault, or other structure used for the task of long-term preservation.

Another function of data processing element 26, in conjunction with request handling/data routing preprocessor 24 is to provide a preview function, which is of particular value for images and documents. Using a sequence of steps outlined below, data processing element 26 generates one or more preview images that can be displayed to an observer at front end 12 or at another sending location. Preview capability provides a visual check on file transfer and conversion operations, enabling operator assessment of any image enhancement operations performed by request handling/data routing preprocessor 24. More importantly, preview capability can allow a user of digital preservation system 10 the option to choose a level of quality for data storage or retrieval by preservation apparatus 18. Using the preview function, a user can view one or more representations of the data record as it would be restored by digital preservation system 10.

Retrieval requests from an operator are received by a retrieval handling processor 60, part of front end 12. Retrieval handling processor 60 cooperates with a control logic processor 20 and with physical storage apparatus 50 to access the preserved record data in physical storage apparatus 50 and provide the retrieved data to a data recovery processor 62 in preservation apparatus 18. The retrieved encoded, human-readable data record can then be made accessible to the requesting operator in some form. For example, a retrieved encoded data record could be printed on a printer or displayed on a terminal of front end 12. Or, the recovered human-readable data record could be provided as a digital data file, capable of being transferred to a networked computer for further processing. Post-processing operations could be applied by retrieval handling processor 60 as appropriate. For example, image enhancements could be performed to suit the display or printing of the retrieved human-readable data record.

Front end 12 is capable of customization to suit the preservation needs and workflow requirements of each individual user of digital preservation system 10 and allows flexibility in accepting input data in a suitable format. A standardized tool kit of interface utilities facilitates the customization of front end 12, so that digital preservation system 10 is adapted to the user environment. In this way, a user has access to the content of preserved data stored in preservation apparatus 18, but does not handle details of operation of preservation apparatus 18. In its internal operation, meanwhile, preservation apparatus 18 has structured components, data transfer formats, and workflow. The operation of preservation apparatus 18 is thereby standardized in order to ensure consistent results that are independent of customer interface differences and specific input data formats. With this arrangement, for example, a single digital preservation system 10 having a single preservation apparatus 18 could serve multiple users, each using a front end 12 having the appropriate set of interface tools, where the interface tools are customized for each client, for example.

Data Processing Components

Referring again to FIG. 3, the central role of control logic processor 20 within preservation apparatus 18 can be readily appreciated. Control logic processor 20 interacts with a number of other processors, both in preservation apparatus 18 and in front end 12, to control the various stages of data encoding, recording, preservation, and retrieval. The scale of digital preservation system 10 and the locations of the various components of system 10 determine how control logic processor 20 is implemented and likewise how its related data processing element 26, request handling/data routing preprocessor 24 in front end 12, and retrieval handling processor 60 are embodied.

In a preferred embodiment, control logic processor 20 is a computer workstation, such as a high-end Windows NT PC or, alternately, a Unix-based workstation. Front end 12 is a separate, networked computer workstation. A single preservation apparatus 18 is capable of interaction with more than one front end 12, such as over a local area network (LAN) or over the Internet, for example. This allows a flexible arrangement with multiple front end 12 workstations, each workstation able to handle preservation requests and to obtain preserved data from preservation apparatus 18.

It must be noted that, for a smaller digital preservation system 10, a single computer workstation could act as front end 12, performing the functions of request handling/data routing preprocessor 24 as well as those of control logic processor 20. However, there are distinct advantages in separating the functions of networked front end 12 from functions of control logic processor 20 in preservation apparatus 18. Front end 12 can be customized to suit the interface requirements and the workflow of a given customer environment, so that multiple front ends 12 can be networked to a single preservation apparatus 18. Such an arrangement would allow a service bureau, for example, to operate preservation apparatus 18 in order to serve multiple clients, each client equipped with a separate, customized front end 12. Preservation apparatus 18 could be located on a server, for example, accessible to a network of front end 12 clients.

A relatively small set of command functions would allow front end 12 to communicate with preservation apparatus 18 in order to provide data records for preservation and to obtain preserved data records maintained by preservation apparatus 18. By keeping front end 12 distinct from preservation apparatus 18, a customer has the benefit of an interposed level of abstraction relative to characteristics of hardware, storage apparatus, scanning apparatus, and other specifics of preservation apparatus 18. Within preservation apparatus 18, aging or obsolete components could be replaced, redundant systems deployed, or internal workflow sequences re-vamped, all without impact on a customer at front end 12.

It can be readily appreciated that request handling/data routing preprocessor 24 preferably has access to substantial storage space, such as one or more large hard disks, to facilitate efficient transfer of large files by front end 12. Storage capacity would also allow buffering of preservation requests, including buffering of the data to be preserved.

Data processing element 26 receives and processes the input data that has been initially received and processed at request handling/data routing preprocessor 24. The primary output of data processing element 26 is processed data that is ready for imaging as the encoded, human-readable data record and is provided to writer 40. In a preferred embodiment, the output of data processing element 26 is rasterized data for driving writer 40.

In a preferred embodiment, data processing element 26 is a separate workstation computer configured to execute a suitable processing program for the input data. Alternately, such as for a small-scale preservation apparatus 18, the functions of data processing element 26 could also be performed by control logic processor 20 hardware. Or, the functions of request handling/data routing preprocessor 24 in front end 12 and data processing element 26 in preservation apparatus 18 could both be performed by a computer workstation that is separate from the computer workstation used as control logic processor 20.

Retrieval handling processor 60 may comprise a separate computer workstation configured to handle and process retrieval requests. Alternately, such as for a small-scale preservation apparatus 18, the functions of retrieval handling processor 60 could be performed by control logic processor 20 hardware.

Networking Arrangements

Referring again to FIG. 3, it can be appreciated that there are numerous possible configurations for interconnection of the various components of digital preservation system 10. In a preferred embodiment, for example, a high-speed ethernet network serves as the interconnection infrastructure for digital preservation system 10. For optimum performance, front end 12 connects to preservation apparatus 18 using this high-speed connection.

Networking could also be used to connect individual processors within preservation apparatus 18 as well as within front end 12. With this arrangement, the individual computer workstations within preservation apparatus 18 that are configured as control logic processor 20, data processing element 26, and retrieval handling processor 60 can then be deployed at different locations, in a manner suitable for the scale and scope of digital preservation apparatus 18. For example, it is generally favorable to have data processing element 26 situated near writer 40; however, it may be preferable to locate other logic control components at a different location.

However, network topology is not limited to an ethernet or local area networking (LAN) scheme. It may be advantageous, for example, to dispose writer 40 in a protected environment at another location. In such a case, component interconnection could employ any of a range of networking types, from high-end, high-speed dedicated telecommunications links to Internet connection, to dial-up modem connection, for example.

Networking also allows flexibility for growth in system capabilities and options. As one example, it may be of benefit for a system 10 to offer its customers the option of imaging using any one of a number of different technologies for imager apparatus 42. In an expanded, networked embodiment of the present invention, multiple sites for imager apparatus 42 are provided. At one site, silver-halide based microfilm in one size is imaged; another site prints encoded, human-readable data records onto a photosensitive medium using a dry process. Linked to both sites, a single data processing element 26 can then prepare the desired record in a suitable manner for the intended data preservation media format. Alternately, each site could employ its own data processing element 26.

In addition, networking also allows flexibility for growth in system scale. Using the networked system arrangement of the present invention, a system can be enlarged to comprise multiple writers 40, multiple sites providing physical storage apparatus 50, and a number of different data recovery processors 62.

Preservation and Retrieval Request Handling

Figure 4:
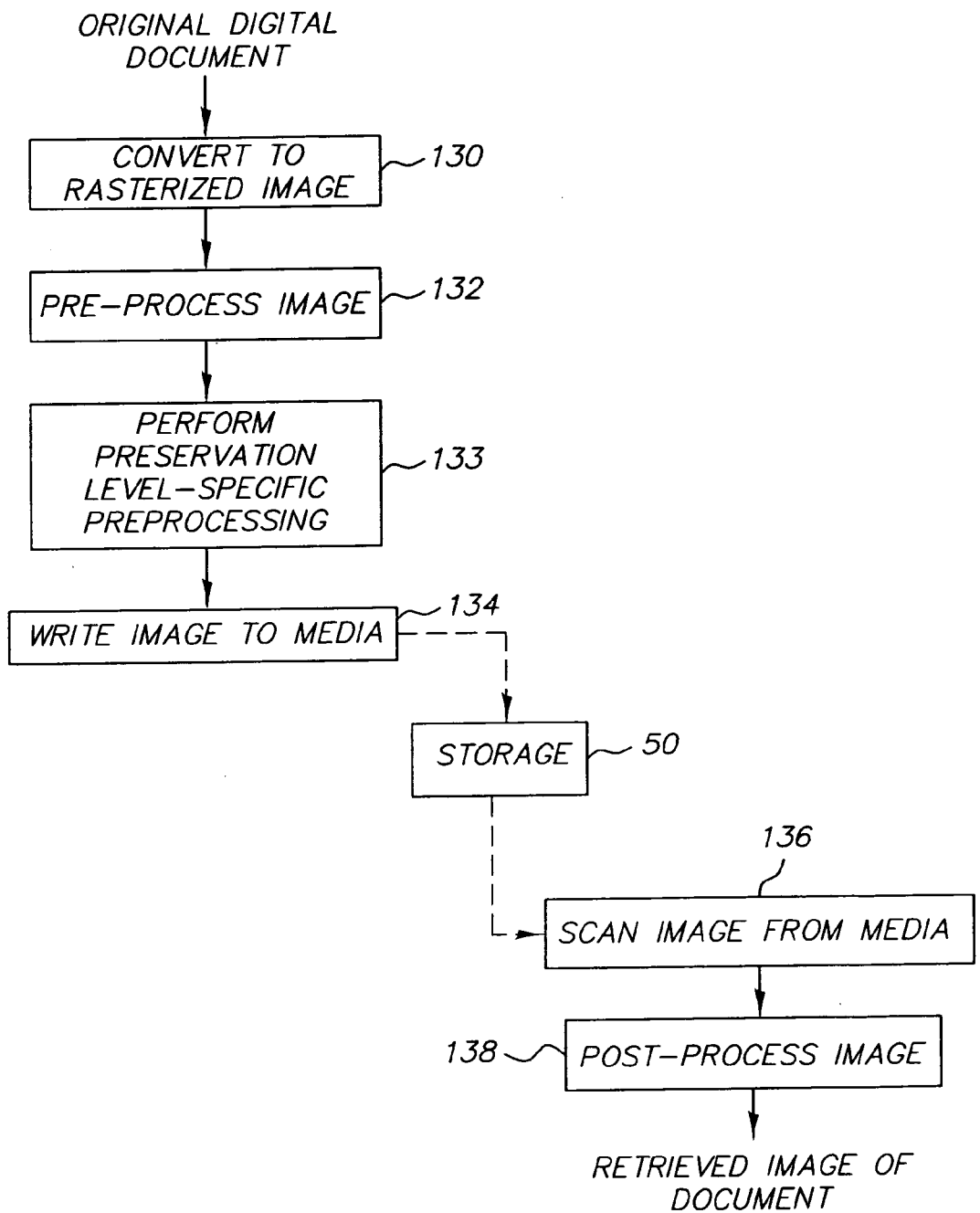
FIG. 4 is a logic flow diagram showing the standard sequence for preserving an image in a data preservation system.

Referring to FIG. 4, there is shown the processing path for document data preservation and retrieval, without consideration of the preview function. An original document, in digital form, is first converted to rasterized image format in an optional rasterization step 130. Rasterization step 130 is optional because some input data is already in raster form. In an image preprocessing step 132, the rasterized image data is preprocessed in preparation for recording onto preservation media. Image preprocessing step 132 is primarily for image quality; image preprocessing step 132 may include any image processing or manipulation that conditions an image for acceptable reproduction on the preservation medium. For example, for some types of film media, it is advisable to thicken lines in a drawing or to adjust the thickness of text characters. Font substitutions may also be performed as part of image preprocessing step 132. Following image preprocessing step 132, a preservation level-specific processing step 133 is executed, to perform further conditioning of image data based on the level of preservation specified for the document data. Then, the image data is written to media in a writing step 134. The preserved document data record that is written is then sent to physical storage apparatus 50. Retrieval steps, again without consideration of preview, are also summarized in FIG. 4. Referring to FIG. 4, for retrieval, the preserved document data record is scanned in a scanning step 136 and post-processed in a post-processing step 138 in order to provide a retrieved image. Post-processing procedures help to adjust the restored document image for display or printing. Functions performed in post-processing step 138 depend on how the document data record was written and scanned, but may include enhancement of image contrast, adjustment of line and text weights, image sharpening, and similar operations.

Figure 5:
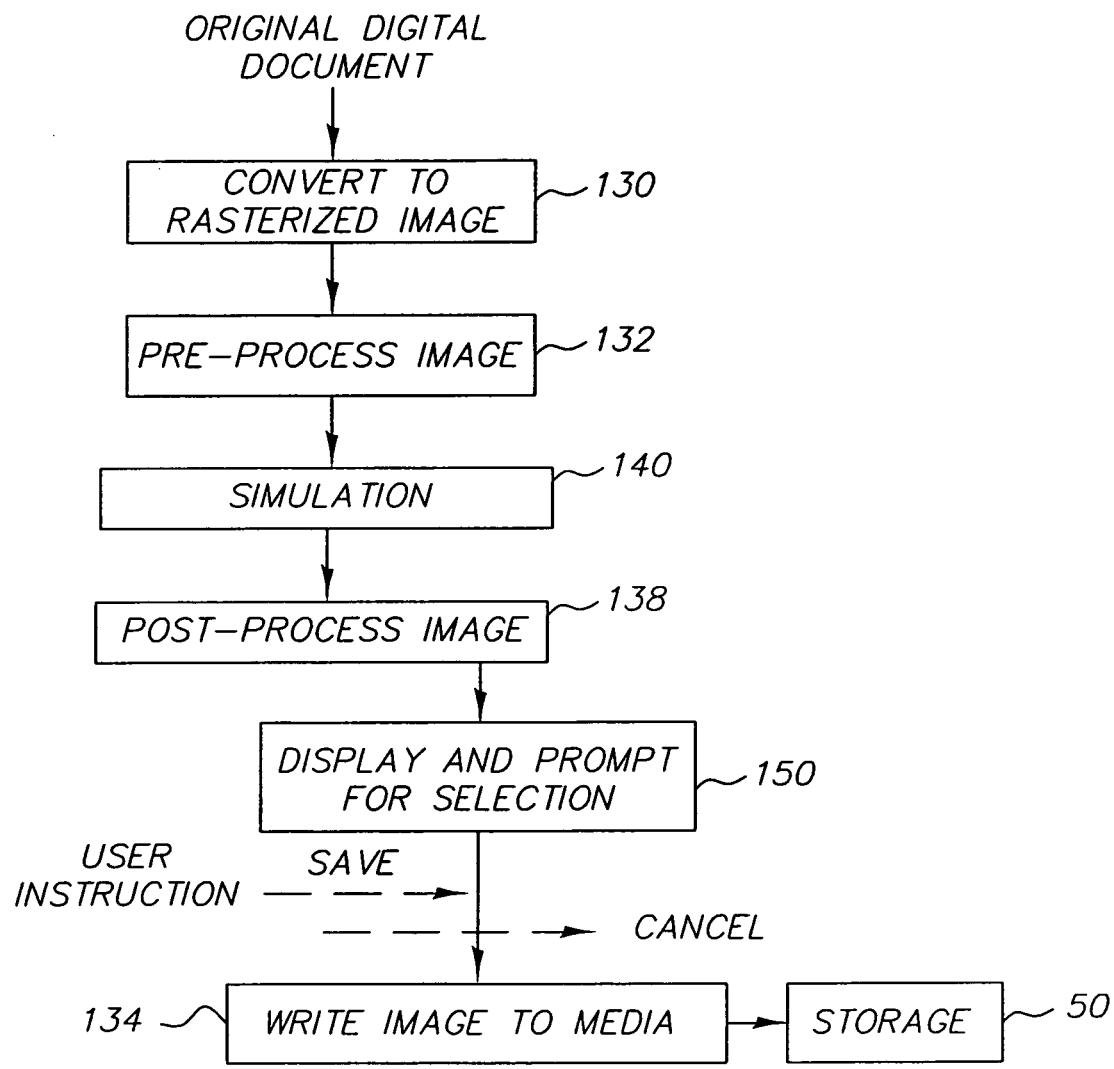
FIG. 5 is a logic flow diagram showing how the preview function augments the workflow of image preservation in the system of the present invention.

The flow diagram of FIG. 5 shows how the preview function changes the sequence of steps of FIG. 4 for preserving the document data record. Following image preprocessing step 132, a simulation step 140 is executed. Briefly, simulation step 140 models the action of preservation level-specific processing step 133, writing step 134, and scanning step 136 with respect to the preserved document data record. A more detailed description of simulation step 140 is given subsequently. Following simulation step 140, post-processing step 138 is then executed, so that a restored image of the original document is now created. A display and prompt step 150 is executed next, providing a preview of the document image and prompting for user response. In the simplest embodiment, the user, after viewing the simulated document image, has the option to approve and continue the preservation process, or to cancel preservation operation for the document data. When the operator command indicates approval, writing step 134 can then be executed and the preserved data record can be stored in physical storage apparatus 50.

Figure 6:
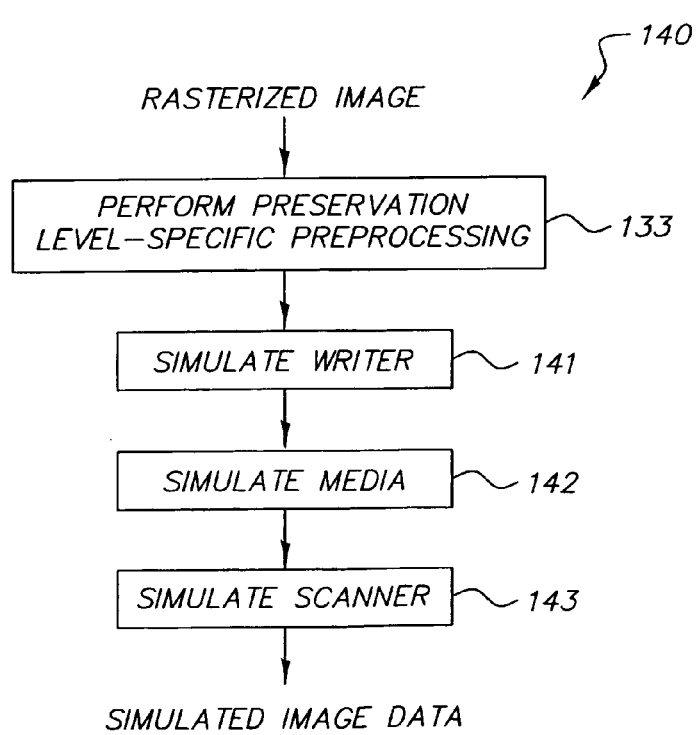
FIG. 6 is a logic flow diagram showing the simulation process used for the preview function of the present invention.

Simulation step 140 for a preferred embodiment is shown in more detail in the flow diagram of FIG. 6. The input to simulation step 140 is a rasterized, pre-processed image. The output from simulation step 140 is one or more simulated images, provided as image data suitable as input for post-processing step 138, as was shown in FIG. 5. The substeps of simulation step 140 in the preferred embodiment of FIG. 6 are executed once for each simulated data record that is to be provided. In this way, simulation step 140 is repeated as a loop for each simulated display. Initially, preservation level-specific preprocessing step 133 is carried out, once for each preservation level that is to be provided. The operation of preservation level-specific preprocessing step 133 varies, depending on the type of preview image that is to be presented. For a bitonal image, for example, preservation level-specific preprocessing step 133 executes a thresholding algorithm. For a halftone image, preservation level-specific preprocessing step 133 applies a halftone screen. For a bit-encoded color image, preservation level-specific preprocessing step 133 assigns a bit encoding to the image. For RGB color separations, preservation level-specific preprocessing step 133 separates an image into its component color planes and adds the necessary fiducial information for registering each plane.

Following preservation level-specific preprocessing step 133, there are three basic processes used to execute simulation step 140 on the resulting image from preservation level-specific preprocessing step 133. Each process tracks the signal-to-noise behavior of components in the imaging chain. In each of these processes, a point operation is first executed to adjust mapping of the data for each pixel to an appropriate density response characteristic. Then, a spatial filter is applied to convolve with the data for each pixel and for neighboring pixels in the image. Following this operation, additional image manipulation for noise or other effects may be performed.

In a writer simulation process 141, a look-up table (LUT) is applied to the image data that is output from image preprocessing step 132. The LUT maps each pixel value to a corresponding density, based on the specific writer 40 to be used for preserving the given document data record. This point operation adjusts the tone reproduction that will be provided to the original rasterized image data. After this adjustment, spatial filtering techniques are applied in order to model the energy transfer behavior of writer 40. Finite impulse response (FIR) information is thereby applied to the image data, so that each pixel is conditioned according to additional information on crosstalk and other spatial effects. As a final step in writer simulation process 141, a warp map or other adjustment may be applied in order to adjust for optical effects or noise due to writer 140 operation.

In a media simulation process 142, the image data output from writer simulation process 141 is modified in order to simulate the interaction of writer 40 and media processor 44 with raw media. Media tone reproduction is first applied, typically as a point operation using an LUT, to the image data. As is well known in the imaging arts, it may be preferred to temporarily increase the resolution of the data, from 8 to 16 bits, for example, during this processing. Next, spatial filtering techniques are employed to modify pixel response as a function of neighboring pixels. Lastly, noise table manipulation or other method is performed in order to model response anomalies due to film grain or other media characteristics.

To continue simulation processing, the image data output from media simulation process 142 is then input to a scanner simulation process 143. Here again, a one-dimensional LUT is used to adjust tone data as a first step. As with preceding simulation processes 141 and 142, the next step applies a spatial filter designed to condition the image data for scanner spatial response characteristics. Finally, a noise table or other mechanism can be applied to simulate known noise characteristics of scanner detector optics and electronics. The output from scanner simulation process 143 is, then, image data that has been conditioned by simulation algorithms so that the likely results of image data preservation and restoration under various conditions can be faithfully represented.

During one or more processes of simulation step 140, it may be necessary to scale the bit depth of the image data, from 8 to 12 or 16 bits, for example. Then, when data must be scaled back to 8 bits, such as in final stages of simulation step 140, some thresholding method would be applied, as is well known in the image processing arts.

As is noted above, the basic simulation processes shown in FIG. 6 are typically executed multiple times, varied each time with appropriate parameters for each document image to be preserved. In a preferred embodiment, these processes are used to provide the following preview images: bitonal image, half-tone grayscale image, continuous tone grayscale image, bit-encoded color image, palletized color-coded image, RGB color separation-encoded image, and CMYK color separation-encoded image.

Figure 7:
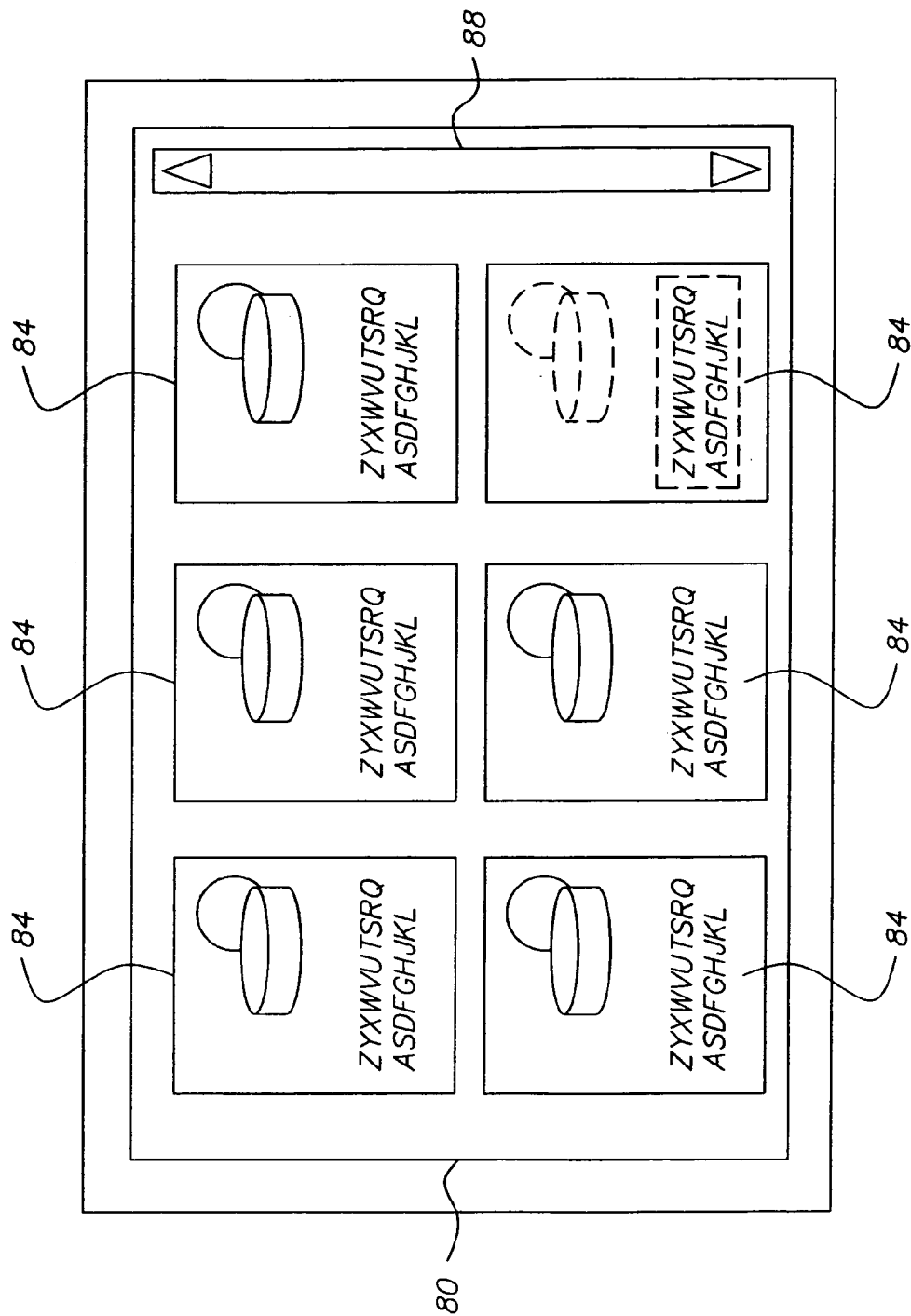
FIG. 7 is a plane view of a display screen showing preview options.

Referring to FIG. 7, there is shown one possible layout arrangement for a display screen 80 that serves as operator interface for providing the preview function of the present invention. On display screen 80, one or more displayed previews 84 are shown, allowing side-by-side comparison for overall image quality. While FIG. 7 shows six displayed previews 84 appearing on display screen 80 at one time, it may not be preferable to display more than one or two displayed previews 84 at one time. In such a case, display navigation tools 88, well known in the operator interface arts, may be provided to allow scrolling or paging through displayed views 84, for example. An operator can then select a level of preservation quality and complexity, such as, for example, preservation of the data as bitonal image, half-tone image, grayscale image, bit-encoded color image, palletized color-coded image, RGB color separation-encoded image, or CMYK color separation-encoded image. Palletized refers to standard index color, for example, Pantone or Websafe. The selection command may be entered using conventional methods such as a mouse click or pull-down menu selection, for example. Alternately, a touchscreen interface could be employed to accept operator touches for entry of scrolling and selection commands. In addition to a preview image, related information such as pricing data may be shown. This would allow a customer to consider various options for document data preservation and retrieval.

It must be emphasized that, within the scope of the present invention, there can be other ways to implement simulation step 140 for conditioning document image data in order to provide a preview function. By actually simulating the appearance of a document image when it is retrieved, the preview function thereby serves as more than a coarse simulation of rasterization, writing, image processing, and scanning operations as they would be performed on the document image data. The preview function offers advantages to both providers and users of digital preservation system 10, representing the expected image quality available when a document image is retrieved at any one of a number of levels. Some users may want to preserve complete information for document images, so that the maximum number of options for image retrieval is available. Other users, however, may want to preserve document images more economically and opt for lower resolution bitonal or grayscale image representation when stored on preservation media.

The data to be preserved as an encoded, human-readable data record can be any type of digital data that can be contained in a file or similar structure. Conventionally, scanned images can be preserved, following well-established models used for microfilm archival of documents. In addition to scanned image preservation, digital preservation system 10 also permits preservation of the source data used to represent a document or image. Document image data itself can comprise not only bit-mapped or byte-oriented image pixel data, but can also include other image-related information. Image-related information can include motion image data, animation sequence data, and image depth information, for example. Digital preservation system 10 also preserves this data in human-readable form, as metadata coupled to its associated document image data. It must be emphasized that the preserved data need not represent a document or image, but could represent other data, such as machine code instructions. In this way, for example, a version of a computer program could be preserved as an encoded, human-readable data record, or raw data such as from a sensing instrument could be preserved in the same form as it was obtained. In the preferred embodiment, the preview function does not provide any type of visualization of this preserved metadata, but rather shows the appearance of image data. For accurate portrayal of the preview, display screen 80 is a high-resolution, full-color computer display screen in the preferred embodiment, such as a CRT or high resolution LED or OLED device.

After a user selects a preview level, the document image data can be directed to equipment suited to the level selected. Of course, the vendor of archival or digital preservation services may opt to save images at some higher quality level, effectively honoring the customer's request, but making it possible to retrieve an even higher quality image at a later date.

Retrieval with Preview

When a retrieval request is received, preview capability may still be available, but with more limited options. For example, a customer may choose not to preview document images, but to accept the image, as a default, using the preservation level that was selected when the image was initially stored. If the document was saved at a higher level, so that options are available for retrieval, a preview function may be provided.

Figure 8:
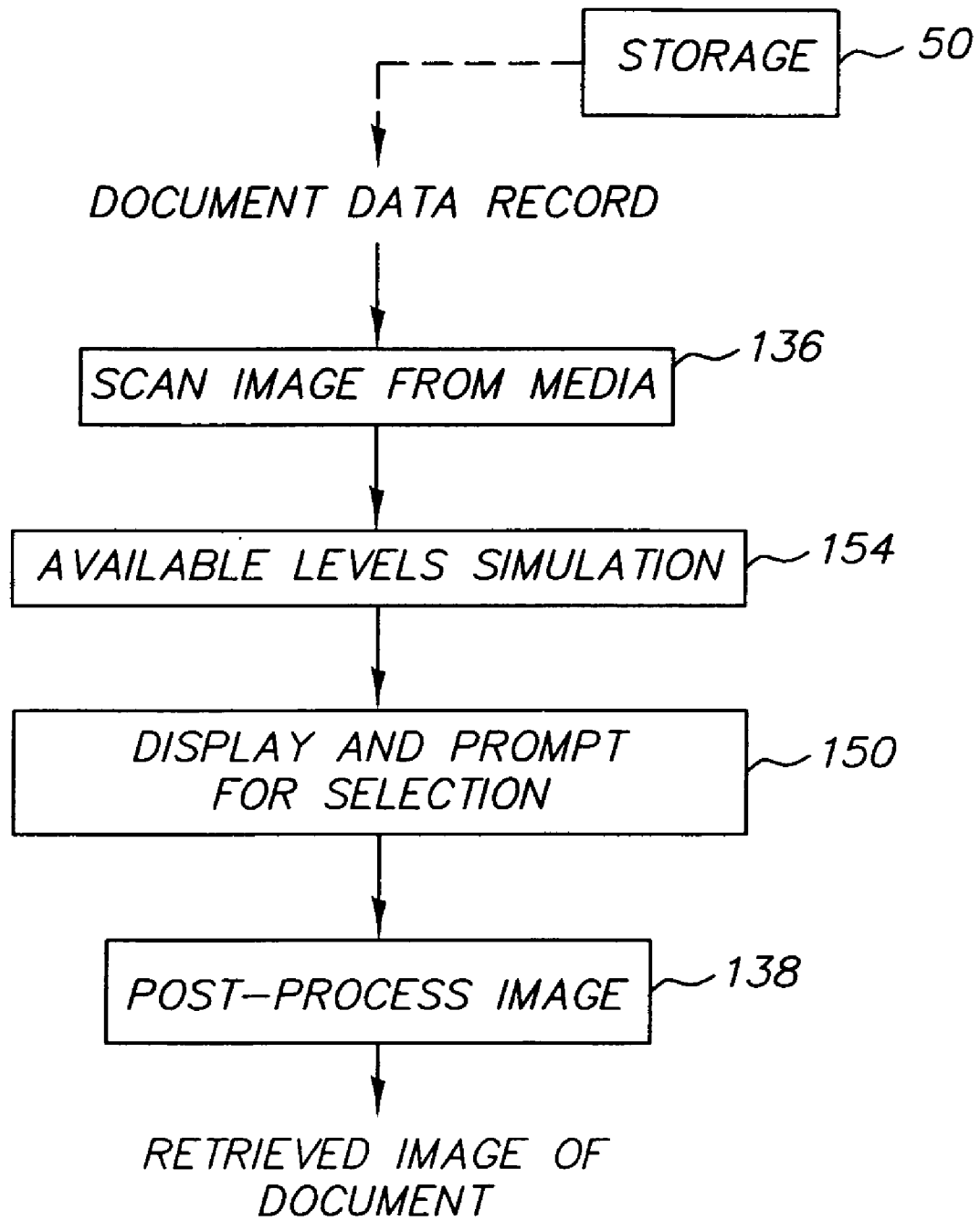
FIG. 8 is a logic flow diagram showing use of the preview function during retrieval of a preserved document data record.

Referring to FIG. 8, there is shown a logic flow diagram of retrieval operation using preview in one embodiment. As was described above, the preserved document data record is scanned in scanning step 136. Next, an available levels simulation step 154 is executed. Here, available levels simulation step 154 would include, for example, preservation level processing step 133 and scanner simulation process 143. The output from available levels simulation step 154 is then one or more simulated images of the preserved document data record. In display and prompt step 150, each simulation is presented to the operator, such as was shown in FIG. 7. When the operator selects a level of image quality for retrieval, post-processing step 138 is executed and the retrieved image provided.

Using the sequence of FIG. 8, a provider of archival or digital preservation services offers its customers the option to specify a level of quality for providing a retrieved image. Thus, even though a customer specifies one level when a document is archived or preserved, the provider can offer an equal or lower level of quality or, if the archived or preserved data supports it, a higher level of quality.

Writer 40

Digital preservation system 10 allows the use of one or more writers 40 for performing the imaging operation that writes encoded data records onto preservation media. As shown in FIGS. 1 and 2, writer 40 components include imager apparatus 42 which typically provides some form of exposure energy for imaging onto raw media. Then, depending on the type of imager apparatus 42 used, media processor 44 may be required for development of the final record.

Writer 40 may comprise a high-resolution, high-volume microfilm apparatus such as a Document Archive Writer, Model 4800, manufactured by Eastman Kodak Company, Rochester, N.Y., for example. Such devices use light exposure in order to image onto cassette-fed film, which is then developed by media processor 44. Other types of writer 40 could employ imaging technologies for which no media processor 44 is necessary, such as laser thermal imaging, for example. Light exposure sources used in imager apparatus 42 could include one or more lamps, LEDs, organic LEDs (OLEDs), lasers, and other sources, and could also make use of light-modulating array elements such as grating light valves, liquid-crystal displays (LCDs), and digital micromirror devices (DMDs). Imager apparatus 42 could also use exposure energy from sources other than light sources, such as from X-rays or from an electron beam, for example. Images could be written in bitonal, half-tone grayscale, or continuous-tone grayscale form. Where human-readable preservation medium 210 is monochrome, color separations themselves can be preserved in grayscale form.

As is represented in FIG. 3, operator intervention may be required for loading and maintaining writer 40 and for operating media processor 44 if needed.

Preservation media for encoded data record preservation, provided to writer 40 as raw media, can be any of the media types specifically designed for maintaining image quality over the long term required for preservation use. Exemplary film types for preservation media include the KODAK Archive Storage Media 3459, manufactured by Eastman Kodak Company, Rochester, N.Y. It should be noted that preservation media could include color or monochrome media and might also include media types not employing silver-halide sensitometry.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while the present invention is most suitable for the long-term requirements of a digital preservation system, it could also be implemented in a shorter term image archival system, for example. While digital preservation system 10 in a preferred embodiment stores data in human-readable form, the preview capability disclosed herein could be used with a conventional archival system that stores images, with or without accompanying data.

Thus, what is provided is a digital preservation system for preservation of data on digital media where the system provides a preview function.

PARTS LIST

10. Digital preservation system
12. Front end
18. Preservation apparatus
20. Control logic processor
24. Request handling/data routing preprocessor
26. Data processing element
30. Indexing database
40. Writer
42. Imager apparatus
44. Media processor
50. Physical storage apparatus
60. Retrieval handling processor
62. Data recovery processor
70. Media source
80. Display screen
84. Displayed previews
88. Display navigation tool
130. Rasterization step
132. Image preprocessing step
133. Preservation level-specific processing step
134. Writing step
136. Scanning step
138. Post-processing step
140. Simulation step
141. Writer simulation process
142. Media simulation process
143. Scanner simulation process
150. Display and prompt step
154. Available levels simulation step
200. Central Processing Unit (CPU)
202. Application
204. Operating system
206. Binary storage hardware
208. Binary storage medium
210. Human-readable preservation medium

What is claimed is:

1. A system for preservation of a data record, the system comprising:
    (a) an input handler for accepting a preservation request to preserve said data record, for accepting input metadata associated with said data record to form a metadata record, and for conversion of said data record and said metadata record to generate a formatted data record;
    (b) a data processor for accepting said formatted data record, for generating at least one preview image from said formatted data record, and for encoding, from said formatted data record, a print file;
    (c) a preservation medium for recording said print file;
    (d) a writer for marking said print file onto said preservation medium to form a human-readable preserved data record;
    (e) a display for representing said at least one preview image;
    (f) a storage apparatus for safekeeping of said human-readable preserved data record;
    (g) a data recovery apparatus for obtaining, from said human-readable preserved data record, said data record and said input metadata record; and
    wherein said at least one preview image is conditioned by a look-up table.

2. A system for preservation of a data record, the system comprising:
    (a) an input handler for accepting a preservation request to preserve said data record, for accepting input metadata associated with said data record to form a metadata record, and for conversion of said data record and said metadata record to generate a formatted data record;
    (b) a data processor for accepting said formatted data record, for generating at least one preview image from said formatted data record, and for encoding, from said formatted data record, a print file;
    (c) a preservation medium for recording said print file;
    (d) a writer for marking said print file onto said preservation medium to form a human-readable preserved data record;
    (e) a display for representing said at least one preview image;
    (f) a storage apparatus for safekeeping of said human-readable preserved data record;
    (g) a data recovery apparatus for obtaining, from said human-readable preserved data record, said data record and said input metadata record; and
    wherein said at least one preview image is conditioned by a spatial filter.

3. A system for preservation of a data record, the system comprising:
    (a) an input handler for accepting a preservation request to preserve said data record, for accepting input metadata associated with said data record to form a metadata record, and for conversion of said data record and said metadata record to generate a formatted data record;
    (b) a data processor for accepting said formatted data record, for generating at least one preview image from said formatted data record, and for encoding, from said formatted data record, a print file;
    (c) a preservation medium for recording said print file;
    (d) a writer for marking said print file onto said preservation medium to form a human-readable preserved data record;
    (e) a display for representing said at least one preview image;
    (f) a storage apparatus for safekeeping of said human-readable preserved data record;
    (g) a data recovery apparatus for obtaining, from said human-readable preserved data record, said data record and said input metadata record; and
    wherein said at least one preview image is bitonal.

4. A system for preservation of a data record, the system comprising:
    (a) an input handler for accepting a preservation request to preserve said data record, for accepting input metadata associated with said data record to form a metadata record, and for conversion of said data record and said metadata record to generate a formatted data record;
    (b) a data processor for accepting said formatted data record, for generating at least one preview image from said formatted data record, and for encoding, from said formatted data record, a print file;
    (c) a preservation medium for recording said print file;
    (d) a writer for marking said print file onto said preservation medium to form a human-readable preserved data record;
    (e) a display for representing said at least one preview image;

(f) a storage apparatus for safekeeping of said human-readable preserved data record;

(g) a data recovery apparatus for obtaining, from said human-readable preserved data record, said data record and said input metadata record; and wherein said at least one preview image is an RGB color image.

5. A system for preservation of a data record, the system comprising:
   (a) an input handler for accepting a preservation request to preserve said data record, for accepting input metadata associated with said data record to form a metadata record, and for conversion of said data record and said metadata record to generate a formatted data record;
   (b) a data processor for accepting said formatted data record, for generating at least one preview image from said formatted data record, and for encoding, from said formatted data record, a print file;
   (c) a preservation medium for recording said print file;
   (d) a writer for marking said print file onto said preservation medium to form a human-readable preserved data record;
   (e) a display for representing said at least one preview image;
   (f) a storage apparatus for safekeeping of said human-readable preserved data record;
   (g) a data recovery apparatus for obtaining, from said human-readable preserved data record, said data record and said input metadata record; and
   wherein said at least one preview image is an CMY color image.

6. A system for preservation of a data record, the system comprising:
   (a) an input handler for accepting a preservation request to preserve said data record, for accepting input metadata associated with said data record to form a metadata record, and for conversion of said data record and said metadata record to generate a formatted data record;
   (b) a data processor for accepting said formatted data record, for generating at least one preview image from said formatted data record, and for encoding, from said formatted data record, a print file;
   (c) a preservation medium for recording said print file;
   (d) a writer for marking said print file onto said preservation medium to form a human-readable preserved data record;
   (e) a display for representing said at least one preview image;
   (f) a storage apparatus for safekeeping of said human-readable preserved data record;
   (g) a data recovery apparatus for obtaining, from said human-readable preserved data record, said data record and said input metadata record; and
   wherein said at least one preview image is a palletized color image.

7. A system for preservation of a data record, the system comprising:
   (a) an input handler for accepting a preservation request to preserve said data record, for accepting input metadata associated with said data record to form a metadata record, and for conversion of said data record and said metadata record to generate a formatted data record;
   (b) a data processor for accepting said formatted data record, for generating at least one preview image from said formatted data record, and for encoding, from said formatted data record, a print file;
   (c) a preservation medium for recording said print file;
   (d) a writer for marking said print file onto said preservation medium to form a human-readable preserved data record;
   (e) a display for representing said at least one preview image;
   (f) a storage apparatus for safekeeping of said human-readable preserved data record;
   (g) a data recovery apparatus for obtaining, from said human-readable preserved data record, said data record and said input metadata record; and
   wherein said display comprises a CRT.

8. A system for preservation of a data record, the system comprising:
   (a) an input handler for accepting a preservation request to preserve said data record, for accepting input metadata associated with said data record to form a metadata record, and for conversion of said data record and said metadata record to generate a formatted data record;
   (b) a data processor for accepting said formatted data record, for generating at least one preview image from said formatted data record, and for encoding, from said formatted data record, a print file;
   (c) a preservation medium for recording said print file;
   (d) a writer for marking said print file onto said preservation medium to form a human-readable preserved data record;
   (e) a display for representing said at least one preview image;
   (f) a storage apparatus for safekeeping of said human-readable preserved data record;
   (g) a data recovery apparatus for obtaining, from said human-readable preserved data record, said data record and said input metadata record; and
   wherein said display comprises a touchscreen.

9. A system for preservation of a data record, the system comprising:
   (a) an input handler for accepting a preservation request to preserve said data record, for accepting input metadata associated with said data record to form a metadata record, and for conversion of said data record and said metadata record to generate a formatted data record;
   (b) a data processor for accepting said formatted data record, for generating at least one preview image from said formatted data record, and for encoding, from said formatted data record, a print file;
   (c) a preservation medium for recording said print file;
   (d) a writer for marking said print file onto said preservation medium to form a human-readable preserved data record;
   (e) a display for representing said at least one preview image;
   (f) a storage apparatus for safekeeping of said human-readable preserved data record;
   (g) a data recovery apparatus for obtaining, from said human-readable preserved data record, said data record and said input metadata record; and
   further comprising an operator console for entering instructions.

10. A system for preservation of a data record, the system comprising:
    (a) an input handler for accepting a preservation request to preserve said data record, for accepting input metadata associated with said data record to form a metadata record, and for conversion of said data record and said metadata record to generate a formatted data record;
    (b) a data processor for accepting said formatted data record, for generating at least one preview image from said formatted data record, and for encoding, from said formatted data record, a print file;
(c) a preservation medium for recording said print file;
(d) a writer for marking said print file onto said preservation medium to form a human-readable preserved data record;
(e) a display for representing said at least one preview image;
(f) a storage apparatus for safekeeping of said human-readable preserved data record;
(g) a data recovery apparatus for obtaining, from said human-readable preserved data record, said data record and said input metadata record; and
wherein said data processor is connected on a network.

11. A preservation apparatus for maintaining at least one preserved data record on a preservation medium, where said at least one preserved data record has a predetermined data format, the apparatus comprising:
(a) a data processor for accepting a data record that comprises input metadata, for providing at least one preview image comprising said data record, and for generating a print file from said data record in response to a print instruction;
(b) a writer for marking said print file onto said preservation medium to form said preserved data record;
(c) a display for providing said at least one preview image and for receiving said print instruction;
(d) a storage apparatus for safekeeping of said preserved data record; and
wherein said at least one preview image is conditioned by a look-up table.

12. A preservation apparatus for maintaining at least one preserved data record on a preservation medium, where said at least one preserved data record has a predetermined data format, the apparatus comprising:
(a) a data processor for accepting a data record that comprises input metadata, for providing at least one preview image comprising said data record, and for generating a print file from said data record in response to a print instruction;
(b) a writer for marking said print file onto said preservation medium to form said preserved data record;
(c) a display for providing said at least one preview image and for receiving said print instruction;
(d) a storage apparatus for safekeeping of said preserved data record; and
wherein said at least one preview image is conditioned by a spatial filter.

13. A preservation apparatus for maintaining at least one preserved data record on a preservation medium, where said at least one preserved data record has a predetermined data format, the apparatus comprising:
(a) a data processor for accepting a data record that comprises input metadata, for providing at least one preview image comprising said data record, and for generating a print file from said data record in response to a print instruction;
(b) a writer for marking said print file onto said preservation medium to form said preserved data record;
(c) a display for providing said at least one preview image and for receiving said print instruction;
(d) a storage apparatus for safekeeping of said preserved data record; and
wherein said at least one preview image is bitonal.

14. A preservation apparatus for maintaining at least one preserved data record on a preservation medium, where said at least one preserved data record has a predetermined data format, the apparatus comprising:
(a) a data processor for accepting a data record that comprises input metadata, for providing at least one preview image comprising said data record, and for generating a print file from said data record in response to a print instruction;
(b) a writer for marking said print file onto said preservation medium to form said preserved data record;
(c) a display for providing said at least one preview image and for receiving said print instruction;
(d) a storage apparatus for safekeeping of said preserved data record; and
wherein said at least one preview image is an RGB color image.

15. A preservation apparatus for maintaining at least one preserved data record on a preservation medium, where said at least one preserved data record has a predetermined data format, the apparatus comprising:
(a) a data processor for accepting a data record that comprises input metadata, for providing at least one preview image comprising said data record, and for generating a print file from said data record in response to a print instruction;
(b) a writer for marking said print file onto said preservation medium to form said preserved data record;
(c) a display for providing said at least one preview image and for receiving said print instruction;
(d) a storage apparatus for safekeeping of said preserved data record; and
wherein said at least one preview image is a CMY color image.

16. A preservation apparatus for maintaining at least one preserved data record on a preservation medium, where said at least one preserved data record has a predetermined data format, the apparatus comprising:
(a) a data processor for accepting a data record that comprises input metadata, for providing at least one preview image comprising said data record, and for generating a print file from said data record in response to a print instruction;
(b) a writer for marking said print file onto said preservation medium to form said preserved data record;
(c) a display for providing said at least one preview image and for receiving said print instruction;
(d) a storage apparatus for safekeeping of said preserved data record; and
wherein said at least one preview image is a palletized color image.

17. A preservation apparatus for maintaining at least one preserved data record on a preservation medium, where said at least one preserved data record has a predetermined data format, the apparatus comprising:
(a) a data processor for accepting a data record that comprises input metadata, for providing at least one preview image comprising said data record, and for generating a print file from said data record in response to a print instruction;
(b) a writer for marking said print file onto said preservation medium to form said preserved data record;
(c) a display for providing said at least one preview image and for receiving said print instruction;
(d) a storage apparatus for safekeeping of said preserved data record; and
wherein said preservation medium is photosensitive.

18. A preservation apparatus for maintaining at least one preserved data record on a preservation medium, where said at least one preserved data record has a predetermined data format, the apparatus comprising:
- (a) a data processor for accepting a data record that comprises input metadata, for providing at least one preview image comprising said data record, and for generating a print file from said data record in response to a print instruction;
- (b) a writer for marking said print file onto said preservation medium to form said preserved data record;
- (c) a display for providing said at least one preview image and for receiving said print instruction;
- (d) a storage apparatus for safekeeping of said preserved data record; and
- wherein said preservation medium comprises a metal plate.

19. A preservation apparatus for maintaining at least one preserved data record on a preservation medium, where said at least one preserved data record has a predetermined data format, the apparatus comprising:
- (a) a data processor for accepting a data record that comprises input metadata, for providing at least one preview image comprising said data record, and for generating a print file from said data record in response to a print instruction;
- (b) a writer for marking said print file onto said preservation medium to form said preserved data record;
- (c) a display for providing said at least one preview image and for receiving said print instruction;
- (d) a storage apparatus for safekeeping of said preserved data record; and wherein said preservation medium comprises a thermal medium.

20. A preservation apparatus for maintaining at least one preserved data record on a preservation medium, where said at least one preserved data record has a predetermined data format, the apparatus comprising:
- (a) a data processor for accepting a data record that comprises input metadata, for providing at least one preview image comprising said data record, and for generating a print file from said data record in response to a print instruction;
- (b) a writer for marking said print file onto said preservation medium to form said preserved data record;
- (c) a display for providing said at least one preview image and for receiving said print instruction;
- (d) a storage apparatus for safekeeping of said preserved data record; and
- wherein said preservation medium is an electrophotographic medium.

21. A preservation apparatus for maintaining at least one preserved data record on a preservation medium, where said at least one preserved data record has a predetermined data format, the apparatus comprising:
- (a) a data processor for accepting a data record that comprises input metadata, for providing at least one preview image comprising said data record, and for generating a print file from said data record in response to a print instruction;
- (b) a writer for marking said print file onto said preservation medium to form said preserved data record;
- (c) a display for providing said at least one preview image and for receiving said print instruction;
- (d) a storage apparatus for safekeeping of said preserved data record; and
- wherein said writer images using an electron beam.

22. A preservation apparatus for maintaining at least one preserved data record on a preservation medium, where said at least one preserved data record has a predetermined data format, the apparatus comprising:
- (a) a data processor for accepting a data record that comprises input metadata, for providing at least one preview image comprising said data record, and for generating a print file from said data record in response to a print instruction;
- (b) a writer for marking said print file onto said preservation medium to form said preserved data record;
- (c) a display for providing said at least one preview image and for receiving said print instruction;
- (d) a storage apparatus for safekeeping of said preserved data record; and
- wherein said writer images using a radiant energy source.

23. A preservation apparatus for maintaining at least one preserved data record on a preservation medium, where said at least one preserved data record has a predetermined data format, the apparatus comprising:
- (a) a data processor for accepting a data record that comprises input metadata, for providing at least one preview image comprising said data record, and for generating a print file from said data record in response to a print instruction;
- (b) a writer for marking said print file onto said preservation medium to form said preserved data record;
- (c) a display for providing said at least one preview image and for receiving said print instruction;
- (d) a storage apparatus for safekeeping of said preserved data record; and
- wherein said display comprises a CRT.

24. A preservation apparatus for maintaining at least one preserved data record on a preservation medium, where said at least one preserved data record has a predetermined data format, the apparatus comprising:
- (a) a data processor for accepting a data record that comprises input metadata, for providing at least one preview image comprising said data record, and for generating a print file from said data record in response to a print instruction;
- (b) a writer for marking said print file onto said preservation medium to form said preserved data record;
- (c) a display for providing said at least one preview image and for receiving said print instruction;
- (d) a storage apparatus for safekeeping of said preserved data record; and
- wherein said display comprises a touchscreen.

25. A method for preservation of an original data record, the method comprising:
- (a) encoding said original data record in a format to form an encoded data record;
- (b) encoding a metadata record corresponding to said encoded data record;
- (c) processing said encoded data record to provide at least one preview image;
- (d) displaying said at least one preview image and accepting a print instruction; and
- (e) in response to said print instruction, recording said encoded data record and said metadata record on a preservation medium, as a human-readable preserved data record.

26. A method for preservation of a data record according to claim 25 wherein the step of processing said encoded data record comprises the step of simulating a writing operation.

27. A method for preservation of a data record according to claim 25 further comprising the steps of:
- (a) scanning said encoded data record from said preservation medium;

(b) processing said encoded data record to provide at least one retrieval preview image;
(c) displaying said at least one retrieval preview image and accepting a retrieval instruction; and
(d) in response to said retrieval instruction, processing said encoded data record to provide said original data record.

28. A method for preservation of a data record according to claim 25 wherein the step of recording said encoded data record and said metadata record on said preservation medium comprises the step of recording on a photosensitive medium.

29. A method for preservation of a data record according to claim 25 wherein the step of recording said encoded data record and said metadata record on said preservation medium comprises the step of recording on a thermal medium.

30. A method for preservation of a data record according to claim 25 wherein the step of recording said encoded data record and said metadata record on said preservation medium comprises the step of recording on an inkjet medium.

31. A method for preservation of a data record according to claim 25 wherein the step of recording said encoded data record comprises the step of using a light source to write the data onto said preservation medium.

32. A method for preservation of a data record according to claim 31 wherein said light source comprises a laser.

33. A method for preservation of a data record according to claim 31 wherein said light source comprises an LED.

34. A method for preservation of a data record according to claim 31 wherein said light source comprises an OLED.

35. A method for preservation of a data record according to claim 31 wherein said light source comprises a lamp.

36. A method for preservation of a data record according to claim 25 wherein the step of recording said encoded data record comprises the step of applying an ink to write the data onto said preservation medium.

37. A method for preservation of a data record according to claim 25 wherein the step of recording said encoded data record comprises the step of using a thermal printhead to write the data onto said preservation medium.

38. A method for preservation of a data record according to claim 25 wherein the step of recording said encoded data record on said preservation medium comprises the step of recording said encoded data record and said metadata record on a photosensitive medium.

39. A method for preservation of a data record according to claim 25 wherein the step of recording said encoded data record on said preservation medium comprises the step of recording said encoded data record and said metadata record on a metallic medium.

40. A method for preservation of a data record according to claim 25 wherein the step of recording said encoded data record on said preservation medium comprises the step of recording said encoded data record and said metadata record on a thermal medium.

41. A method for preservation of a data record according to claim 25 wherein the step of accepting a print instruction comprises the step of accepting a touchscreen command.

42. A method for preservation of a data record according to claim 25 wherein the step of displaying said at least one preview image comprises the step of using a browser.

43. A system for preservation of a data record comprising:
(a) converting said data record to a rasterized image;
(b) preprocessing said rasterized image to generate a preprocessed image;
(c) simulating a retrieved data record to generate a simulated retrieved data record comprising:
simulating a media writer;
simulating a media;
simulating a retrieval scanner;
(d) postprocessing said simulated retrieved data record to generate a postprocessed simulated retrieved data record;
(e) displaying said postprocessed simulated retrieved data record;
(f) prompting a user for approval of said postprocessed simulated retrieved data record;
(g) if said postprocessed simulated retrieved data record is approved by said user, write said preprocessed image to said media; if said postprocessed simulated data record is not approved by said user, cancel preservation operation.

44. A system as in claim 43 comprising:
(i) storing said media; and
(j) recovering said preprocessed image.

45. A system as in claim 43 wherein said rasterized image is in human readable format.

46. A system as in claim 43 wherein said media is an analog media.

* * * * *